(12) United States Patent
Gerber et al.

(10) Patent No.: US 9,562,176 B2
(45) Date of Patent: Feb. 7, 2017

(54) PREPOLYMER TOUGHENER FOR CRACK-RESISTANT ADHESIVES FOR WINDMILLS

(71) Applicant: SIKA TECHNOLOGY AG, Baar (CH)

(72) Inventors: Ulrich Gerber, Uitikon-Waldegg (CH); Jürgen Finter, Freiburg (DE)

(73) Assignee: SIKA TECHNOLOGY AG, Baar (CH)

( * ) Notice: Subject to any disclaimer, the term of this patent is extended or adjusted under 35 U.S.C. 154(b) by 19 days.

(21) Appl. No.: 14/429,642

(22) PCT Filed: Sep. 23, 2013

(86) PCT No.: PCT/EP2013/069747
§ 371 (c)(1),
(2) Date: Mar. 19, 2015

(87) PCT Pub. No.: WO2014/044851
PCT Pub. Date: Mar. 27, 2014

(65) Prior Publication Data
US 2015/0232710 A1    Aug. 20, 2015

(30) Foreign Application Priority Data

Sep. 24, 2012 (EP) .................................... 12185699

(51) Int. Cl.
| | | |
|---|---|---|
| *C09J 11/08* | (2006.01) | |
| *C08G 18/76* | (2006.01) | |
| *C08G 18/66* | (2006.01) | |
| *C08G 18/12* | (2006.01) | |
| *C08G 18/58* | (2006.01) | |
| *C09J 163/00* | (2006.01) | |
| *C09J 9/00* | (2006.01) | |

(52) U.S. Cl.
CPC ................ *C09J 11/08* (2013.01); *C08G 18/12* (2013.01); *C08G 18/58* (2013.01); *C08G 18/6674* (2013.01); *C08G 18/7671* (2013.01); *C09J 9/00* (2013.01); *C09J 163/00* (2013.01)

(58) Field of Classification Search
CPC ..... C08G 18/7671; C08G 18/58; C09J 163/00
USPC ......................................................... 525/460
See application file for complete search history.

(56) References Cited

U.S. PATENT DOCUMENTS

| | | | |
|---|---|---|---|
| 4,952,645 A | 8/1990 | Mulhaupt et al. | |
| 5,290,857 A | 3/1994 | Ashida et al. | |
| 8,076,424 B2 * | 12/2011 | Kramer | C07D 303/24 |
| | | | 156/330 |
| 9,012,575 B2 * | 4/2015 | Finter | C08G 18/12 |
| | | | 523/400 |
| 2010/0087567 A1 | 4/2010 | Finter et al. | |
| 2010/0104831 A1 * | 4/2010 | Kanagawa | C08G 18/4018 |
| | | | 428/198 |

FOREIGN PATENT DOCUMENTS

| | | |
|---|---|---|
| CN | 101646706 A | 2/2010 |
| DE | 41 29 936 A1 | 3/1992 |
| EP | 1 972 646 A1 | 9/2008 |
| WO | 2004/055092 A1 | 7/2004 |

OTHER PUBLICATIONS

Machine Translation of DE 4129936 A.*
Jan. 3, 2014 Search Report issued in International Patent Application No. PCT/EP2013/069747.
Mar. 24, 2015 International Preliminary Report on Patentability issued in International Patent Application No. PCT/EP2013/069747.
Aug. 18, 2016 Office Action issued in Chinese Application No. 201380049523.9.

* cited by examiner

*Primary Examiner* — Mike M Dollinger
(74) *Attorney, Agent, or Firm* — Oliff PLC

(57) ABSTRACT

A composition is described which includes A) a chain-extended prepolymer, which can be obtained from the reaction of a) a polymer containing at least one amino, thiol or hydroxyl group, b) at least one polyisocyanate and c) at least one alkoxylated bisphenol as chain extender, and optionally d) an epoxide compound containing a primary or secondary hydroxy group, said compound containing a primary or secondary hydroxyl group, or at least one epoxy resin A which contains this epoxide compound, and optionally B) an epoxy resin B. The composition is suitable as a toughener or as an A component of a 2k epoxy resin adhesive which contains this toughener. The adhesive is suitable particularly for bonding in windmills.

17 Claims, No Drawings

PREPOLYMER TOUGHENER FOR CRACK-RESISTANT ADHESIVES FOR WINDMILLS

TECHNICAL FIELD

The invention relates to a composition containing a prepolymer toughener, a process for the preparation thereof and its use as an A component of a 2k epoxy resin adhesive which contains this toughener, which is suitable particularly for bonding applications in windmills.

PRIOR ART

In the production of both vehicles and mounted parts or machinery and instruments increasingly high quality adhesives are used in place of or in combination with conventional joining techniques such as screwing, riveting, punching or welding. This creates advantages and new opportunities in production, for example the production of composite and hybrid materials, or greater freedom in the design of components. The adhesives must have good adhesion to all substrates used. These good adhesion characteristics must be maintained especially after aging (alternating climate, salt spray, etc.) without much loss of quality.

In the case of 2k adhesives, the curing should occur at room temperature over the course of several days to about 1 week; however, an accelerated curing regimen such as, e.g., 4 h at r.t. followed by 30 min at 60° C. or 85° C. should also be applicable.

From the literature, two methods are known as to how to reduce the brittleness of epoxy adhesives and thus to increase their impact strength: on the one hand, this object can be achieved by the addition of at least partially cross-linked high molecular compounds such as latices of core/shell polymers or other flexibilizing polymers and copolymers. Such a method is described, e.g., in U.S. Pat. No. 5,290,857. On the other hand, by introducing soft segments, e.g., by the corresponding modification of the epoxy components, a certain increase in toughness can be achieved. Thus, U.S. Pat. No. 4,952,645 describes epoxy resin compositions which were flexibilized by reaction with carboxylic acids, in particular di- or trimeric fatty acids, as well as with carboxylic acid-terminated diols.

An alternative is the use of a liquid rubber as toughener in epoxy resins, wherein the liquid rubber is a carboxyl- or epoxy-terminated acrylonitrile/butadiene copolymer or a derivative thereof (CTBN, CTBNX or ETBN).

WO 2004/055092 A1 describes thermosetting epoxy resin compositions with improved impact strength by using an epoxy-group-terminated impact strength modifier in the epoxy adhesive, wherein the impact strength modifier is obtained by reaction of an isocyanate-terminated prepolymer with hydroxyl-terminated epoxy compounds.

EP 1 972 646 A1 discloses epoxy group-terminated polyurethane polymers wherein first a prepolymer is prepared from a di-/tri-isocyanate, a polymer polyol and an alkoxylated bisphenol, and this is then reacted with an epoxy compound containing a primary or secondary hydroxyl group. These are used as impact strength modifiers in epoxy resin compositions, especially in adhesive compositions.

DE 41 29 936 A1 discloses a moisture-curable polyurethane resin composition containing, in a mixed form, a urethane prepolymer made of a polyol reactant and a polyisocyanate, a catalyst to accelerate moisture-induced curing of the composition and a stabilizing agent.

In bonding applications for windmill blades high demands are imposed on crack resistance and impact strength of the adhesive. Windmill blades can have a size of 60 m resulting in an adhesive requirement of up to 500 kg. Therefore, the cost of the adhesive is a factor not to be underestimated.

Hitherto, e.g., epoxy rubbers on the basis of CTBN have been used for such applications. These are quite expensive and their mechanical stability leaves something to be desired. Epoxy adhesives with core/shell polymers are also used. However, they have a high viscosity, which makes them difficult to apply, and they are also quite expensive.

DESCRIPTION OF THE INVENTION

Object of the present invention is to provide a toughener and an epoxy resin adhesive containing the toughener which is suitable for bonding application in windmills and can withstand high mechanical stress. In addition, the solution should be economical.

The object is surprisingly achieved by a composition comprising A) an extended-chain prepolymer that can be obtained from the reaction of a) at least one polymer of formula (I)

wherein $X_1$=O, S or NH; $Y_1$ represents an n-valent radical of a reactive polymer after removal of terminal amino, thiol or hydroxyl groups; and n=2, 3 or 4; preferably 2 or 3, b) at least one polyisocyanate of the formula (II)

wherein $Y_2$ represents a divalent radical of aliphatic, cycloaliphatic, aromatic or araliphatic diisocyanates after removal of the isocyanate groups, or for a trivalent radical of trimers or biurets of aliphatic, cycloaliphatic, aromatic or araliphatic diisocyanates after removal of the isocyanate groups; and m=1 or 2; and c) at least one alkoxylated bisphenol as chain extender, and optionally d) an epoxide compound containing a primary or secondary hydroxyl group of formula (III)

wherein $Y_3$ represents a radical of an aliphatic, cycloaliphatic, aromatic or araliphatic epoxide containing a primary or secondary hydroxyl group after removal of the epoxide groups and the primary or secondary hydroxyl group; and q=1, 2 or 3; or at least one epoxy resin A containing an epoxide compound of formula (III).

The composition containing the prepolymer toughener can be produced relatively inexpensively and as the A component of a 2k epoxy adhesive produces cured materials with excellent mechanical properties, in particular a high crack resistance (>3% elongation). By chain extension, an improved modulus of elasticity can be achieved. Furthermore, the composition can be formulated with a relatively low viscosity so that it is readily processed, and still shows the excellent mechanical properties.

The invention will be explained in detail below.

Prepolymers are oligomeric or already polymeric compounds, which serve as precursors or intermediates for the synthesis of high molecular weight substances. The prefix "poly" in expressions such as polyol or polyisocyanate means that the compound has two or more of said groups; a polyol is thus a compound having two or more hydroxyl groups.

The composition according to the invention contains a chain-extending prepolymer which is suitable as toughener. The prepolymers are also known as polyurethane polymers or PU polymers. The prepolymer is the reaction product of components a), b) and c) and optionally of component d). Provided that component d) is not used, an isocyanate group-terminated prepolymer is obtained. When using optional component d), the isocyanate end groups of the prepolymer are completely or preferably partially blocked, so that a fully or preferably partially epoxy group-terminated prepolymer can be obtained.

The compounds of formula (I)

have $X_1H$ groups. These may independently of one another be OH, SH, $NH_2$. Preferred are amine and hydroxyl groups, wherein the hydroxyl group is particularly preferred. $Y_1$ represents an n-valent radical of a reactive polymer after removal of terminal amino, thiol or hydroxyl groups; and n is 2, 3 or 4; preferably 2 or 3. The $X_1H$ group-bearing compounds of formula (I) may be prepolymers or polymers. One or more polymers of formula (I) may be used.

Preferred compounds of formula (I) are polyols, for example, the following commercial polyols or any mixtures thereof:

Polyoxyalkylene polyols, also called polyether polyols, which are the polymerization product of ethylene oxide, 1,2-propylene oxide, 1,2- or 2,3-butylene oxide, tetrahydrofuran, or mixtures thereof, optionally polymerized using a starter molecule having two or three active H atoms such as, for example, water or compounds having two or three OH groups. Both polyoxyalkylene polyols which have a low degree of unsaturation (measured according to ASTM D-2849-69 and expressed in milliequivalents of unsaturation per gram of polyol (meq/g)), prepared, for example, with the aid of so-called double metal cyanide complex catalysts (short DMC catalysts), and polyoxyalkylene polyols with a higher degree of unsaturation, prepared, for example, with the aid of anionic catalysts such as NaOH, KOH or alkali metal alkoxides, can be used. Especially suitable are polyoxypropylene diols and triols, and in particular with a degree of unsaturation of less than 0.02 meq/g and/or having a molecular weight in the range of 1000 to 30,000 g/mol, polyoxybutylene diols and triols, polyoxypropylene diols and triols, in particular with a molecular weight of 400 to 8000 g/mol, and so-called "EO-endcapped" (provided with ethylene oxide end groups) polyoxypropylene diols or triols. The latter are specific polyoxypropylene polyoxyethylene polyols that are obtained, for example, by alkoxylating pure polyoxypropylene polyols with ethylene oxide following the completion of the polypropoxylation, and thus have primary hydroxyl groups;

polyester polyols, produced for example from dihydric to trihydric alcohols such as, for example, 1,2-ethane diol, diethylene glycol, 1,2-propane diol, dipropylene glycol, 1,4-butane diol, 1,5-pentane diol, 1,6-hexane diol, neopentyl glycol, glycerol, 1,1,1-trimethylolpropane or mixtures of the aforementioned alcohols with organic dicarboxylic acids or the anhydrides or esters thereof such as, for example, succinic acid, glutaric acid, adipic acid, suberic acid, sebacic acid, dodecane dicarboxylic acid, maleic acid, fumaric acid, phthalic acid, isophthalic acid, terephthalic acid, hexahydrophthalic acid, or mixtures of the aforementioned acids, as well as polyester polyols from lactones such as for example from ε-caprolactone; and polycarbonate polyols such as those that can be obtained for example by reacting the above-mentioned alcohols—used to build up the polyester polyols—with dialkyl carbonates, diaryl carbonates or phosgene.

Furthermore, also di- or higher functional amine-terminated polyethylene ethers, polypropylene ethers, polybutylene ethers, polybutadienes, polybutadiene-acrylonitrile as well as other amine-terminated synthetic rubbers or mixtures of the components mentioned may be used as compounds of formula (I).

Preferred compounds of formula (I) are α,ω-polyalkylene glycols with $C_2$-$C_6$ alkylene groups or with mixed $C_2$-$C_6$ alkylene groups, terminated with amino, thiol or hydroxyl groups, preferably hydroxyl groups.

Preferred are polyether polyols, such as polyethylene glycols, polypropylene glycols, polytetrahydrofurans, polyethylene glycol-polypropylene glycol block polymers and polybutylene glycols, polybutadiene polyols, such as hydroxyl-terminated polybutadiene and hydroxyl-terminated polybutadiene-co-acrylonitrile, hydroxyl-terminated synthetic rubbers, polyester polyols, polycarbonate polyols, amine-terminated polyethers such as polyether amines with two, three or four amine end groups (e.g., Jeffamine®), and mixtures thereof, wherein polyether polyols are particularly preferred.

Advantageously, the compounds of formula (I) bearing $X_1H$ groups are di- or higher functional polyols having OH equivalent weights of 600 to 6000 g/OH equivalent, preferably 700 to 2200 g/OH equivalent.

The molecular weight of the polymers of formula (I) used can vary within wide ranges. For instance, they preferably have a weight average molecular weight (Mw), e.g., determined by light scattering, of less than 15,000, preferably less than 4,000, e.g., in the range of about 1,500 to 3,000, in particular 1,500 to 2,500. Suitable polyethers are, for example, commercially available polytetrahydrofurans such as, e.g., PolyTHF® from BASF, such as PolyTHF® 1800, PolyTHF® 2000 or PolyTHF® 2800, or polypropylene oxides such as Caradol® from Shell or Acclaim® from Bayer.

As component b) one or more polyisocyanates of formula (II) are used

wherein $Y_2$ represents a divalent radical of aliphatic, cycloaliphatic, aromatic or araliphatic diisocyanates after removal of the isocyanate groups, or represents a trivalent radical of trimers or biurets of aliphatic, cycloaliphatic, aromatic or araliphatic diisocyanates after removal of the isocyanate groups; and m=1 or 2.

Suitable polyisocyanates of formula (II) are diisocyanates or triisocyanates. Suitable diisocyanates are aliphatic, cycloaliphatic, aromatic or araliphatic diisocyanates, in particular commercial products such as methylene diphenyl diisocyanate (MDI), hexamethylene diisocyanate (HDI), toluene diisocyanate (TDI), toluidine diisocyanate (TODI), isophorone diisocyanate (IPDI), trimethylhexamethylene diisocyanate (TMDI), 2,5- or 2,6-bis-(isocyanatomethyl)-bicyclo[2.2.1]heptane, 1,5-naphthalene diisocyanate (NDI), dicyclohexyl methyl diisocyanate ($H_{12}$MDI), p-phenylene diisocyanate (PPDI), m-tetramethyl xylylene diisocyanate (TMXDI), etc., and the dimers thereof. Preferred are HDI, IPDI, MDI or TDI, with MDI being particularly preferred.

Suitable triisocyanates are trimers or biurets of aliphatic, cycloaliphatic, aromatic or araliphatic diisocyanates, in particular the isocyanurates and biurets of the diisocyanates described in the previous paragraph.

Another possibility for $Y_1$ in formula (I) are chain-extended radicals of molecules after removal of the $X_1H$ groups, which can be obtained formally by a reaction similar to the reaction between the aforementioned di- or triols and/or di- or triamines as well as the aforementioned di- or tri-isocyanates. This is achieved by varying the stoichiometry of the reactants. The chain length and degree of cross-linking of the polymers of formula (I) are highly dependent on the molar ratio [$X_1H$]/[NCO], which is known to the skilled person.

An alkoxylated bisphenol as component c) is used as a chain extender. Bisphenols are a well-known class of compounds bearing two hydroxyphenyl groups. In other words, bisphenols have two phenyl rings that are linked via a hydrocarbon bridge. In general, the hydroxy groups of the phenyl group in each case are in the para-position to the hydrocarbon bridge, and this is also preferred. The hydroxy group may also be in the ortho or meta position relative to the bridge.

The hydrocarbon bridge can be a complex bridge such as a diisopropyl-benzene group, but usually it is an unsubstituted, mono- or disubstituted methylene group. Suitable substituents for the methylene group are, for example, alkyl groups, in particular $C_{1-4}$ alkyl such as methyl and ethyl, aryl such as phenyl, or phenyl substituted with one or more $C_{1-4}$ alkyl groups, and cycloalkylidene groups such as fluorenylidene, cyclohexylidene, and cyclohexylidene substituted with one or more alkyl groups. The phenyl groups in each case may bear in addition to the hydroxyl group one or more further substituents, e.g. $C_{1-4}$ alkyl, such as methyl, ethyl, isopropyl and isobutyl, cycloalkyl, such as cyclohexyl, or aryl such as phenyl. A preferred bisphenol is bisphenol F or a derivative thereof, wherein bisphenol F derivatives are substituted at the methylene group and/or at the phenyl groups, e.g., with one or more of the aforementioned substituents.

According to the invention an alkoxylated bisphenol is used. An alkoxylation of hydroxyl groups, here of the hydroxyphenyl groups, is a common reaction in chemistry, resulting in the formation of alkylene oxide adducts of the hydroxy group-bearing compounds. All typical alkylene oxide adducts of bisphenols can be used, such as ethylene oxide, propylene oxide or butylene oxide adducts (1,2-butylene oxide or 2,3-butylene oxide) or mixtures thereof. Ethoxylated bisphenols are preferred. Mono- or dialkoxylated bisphenols can be used, with dialkoxylated bisphenols being preferred, i.e., at both hydroxyl groups at least one alkylene oxide is added.

For example, the alkoxylated bisphenol can be an alkoxylated, in particular ethoxylated, propoxylated or butoxylated bis-(4-hydroxyphenyl)-methane (bisphenol F), 1,1-bis-(4-hydroxyphenyl)-ethane (bisphenol E), 2,2-bis-(4-hydroxyphenyl)-propane (bisphenol A), 1,1-bis-(4-hydroxyphenyl)-1-phenylethane (bisphenol AP), 2,2-bis-(4-hydroxyphenyl)-butane (bisphenol B), bis-(4-hydroxyphenyl)-diphenylmethane (bisphenol BP), 2,2-bis-(3-methyl-4-hydroxyphenyl)-propane (bisphenol C), 9,9-bis-(4-hydroxyphenyl)-fluorene (bisphenol FL), 2,2-bis-(4-hydroxy-3-isopropylphenyl)-propane (Bisphenol G), 1,3-bis-(2-(4-hydroxyphenyl)-2-propyl)-benzene (bisphenol M), 1,4-bis-(2-(4-hydroxyphenyl)-2-propyl)-benzene (bisphenol P), 2,2-[5,5'-bis-[1,1'-(biphenyl)-2-ol]]-propane (bisphenol PH), 1,1-bis-(4-hydroxyphenyl)-3,3,5-trimethylcyclohexane (bisphenol TMC) or 1,1-bis-(4-hydroxyphenyl)-cyclohexane (bisphenol Z), with alkoxylated bisphenol A and, in particular, ethoxylated bisphenol A being particularly preferred.

The degree of alkoxylation of the bisphenol can vary within wide ranges. The alkoxylated bisphenol can have, e.g., 1 to 15 mol of alkyleneoxy units, preferably 3 to 15 mol of alkyleneoxy units, more preferably 2 to 10 mol of alkyleneoxy units or 3 to 10 mol of alkyleneoxy units, and particularly preferably 3 to 6 mol of alkyleneoxy units per 1 mol of bisphenol.

Alkoxylated bisphenols are commercially available. Specific examples are Simulsol® BPIE from Sepic/Air Liquide, a bisphenol A with 3 ethylene oxide units as shown below, and Aduxol®BP-TMC from His-Bis GmbH/Schaerrer Rothrist, a bisphenol TMC with 3 or 5 ethylene oxide units as shown below.

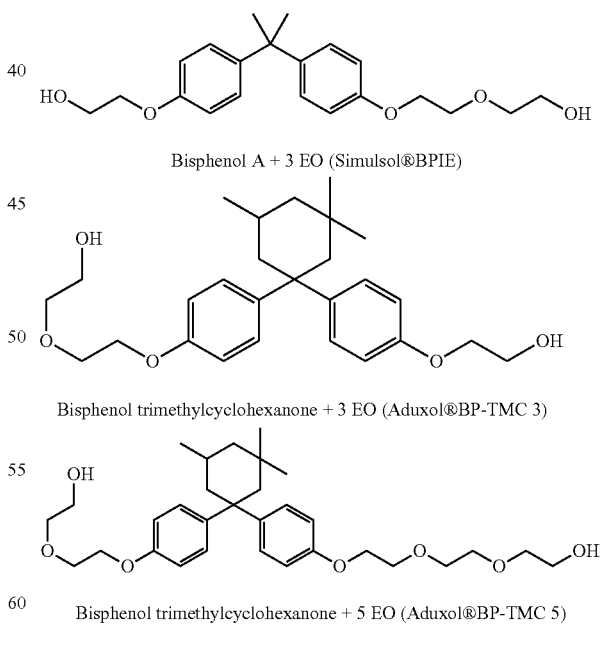

Bisphenol A + 3 EO (Simulsol®BPIE)

Bisphenol trimethylcyclohexanone + 3 EO (Aduxol®BP-TMC 3)

Bisphenol trimethylcyclohexanone + 5 EO (Aduxol®BP-TMC 5)

Optionally, in addition, an epoxy compound of the following formula (III) containing a primary or secondary hydroxyl group or at least an epoxy resin A containing an epoxy compound of formula (III) may be used to prepare the chain-extended prepolymer.

(III)

wherein $Y_3$ represents a radical of an aliphatic, cycloaliphatic, aromatic or araliphatic epoxide containing a primary or secondary hydroxyl after removal of the epoxy groups and primary or secondary hydroxyl groups; and $q=1$, 2 or 3. Preferred is the use of an epoxy resin containing an epoxide compound of formula (III).

Epoxy resins are obtained, e.g., by the reaction of an epoxy compound such as, e.g., epichlorohydrin, with a multi-functional alcohol, i.e., a diol, triol or polyol. When reacting multi-functional alcohols with an epoxy compound such as, e.g., epichlorohydrin, depending on the reaction conditions, the corresponding hydroxy epoxy compounds also form as byproducts in various concentrations. They can be isolated by conventional separation operations. According to the invention, however, the product mixture obtained in the glycidylation reaction of polyols, made up of polyol that had reacted completely or partially with formation of glycidyl ether, can be used. Examples of these hydroxyl-containing epoxides in epoxy resins are trimethylol propane diglycidyl ether contained in a mixture in trimethylol propane triglycidyl ether, glycerol diglycidyl ether contained as a mixture in glycerol triglycidyl ether, pentaerythritol triglycidyl ether contained as a mixture in pentaerythritol tetraglycidyl ether and epoxy resins comprising butanediol diglycidyl ether or cyclohexane dimethanol diglycidyl ether. However, other similar hydroxyl-containing epoxides, in particular glycidol, 3-glycidyloxybenzyl alcohol or hydroxymethyl cyclohexene oxide can be used.

Also, epoxy resins described below for epoxy resins B can be used, provided that they contain an epoxy compound of formula (III) containing a primary or secondary hydroxyl group. The epoxy compound of formula (III) containing a primary or secondary hydroxyl group of the epoxy resins B described below can also be used in isolated form.

If a component d) is used in the preparation of the prepolymer, a castor oil glycidyl ether containing a hydroxyl-containing epoxy compound of formula (III) is preferably used as epoxy resin A. Such castor oil glycidyl ethers are commercially available, e.g., as Erysis®GE 35 H from CVC/Emerald Thermoset Specialities, Moorestown, N.J. Below, a simplified structure of the castor oil glycidyl ether:

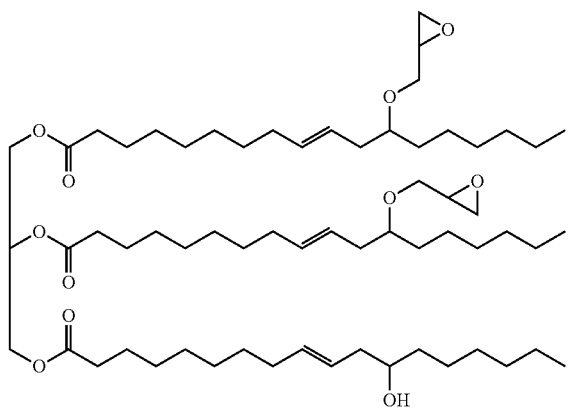 [SMILES: CCCCCCC(O)C/C=C/CCCCCCCC(=O)OCC(COC(=O)CCCCCCC/C=C/CC(CCCCCC)OCC1CO1)OC(=O)CCCCCCC/C=C/CC(CCCCCC)OCC1CO1]

The castor oil glycidyl ether Erysis®GE 35 H is a low viscosity flexibilizing epoxy resin having an average epoxy equivalent weight of 550 to 650 g/equivalent. As can be seen from the specified epoxy equivalent weight and simplified structure above, the reaction of castor oil and epichlorohydrin is not complete, i.e., there are still unreacted free hydroxyl groups. The hydroxyl number is about 80 mg KOH/g.

The components a), b), c) and optionally d) are preferably used in proportions such that the molar ratio of the isocyanate groups to the hydroxyl groups in these components is less than 1 and is preferably in the range of 0.75 to 0.9. In contrast, in the preparation of prepolymers according to the prior art without chain extenders, an excess of isocyanate groups is used. The higher the isocyanate content, the longer the prepolymer will become. The NCO content of the chain-extended prepolymer in the composition can vary, but it typically ranges from 2.6 to 3.5% before epoxy resin B is added.

The chain-extended prepolymer contained in the composition is suitable as a toughener for epoxy resin formulations. Therefore, preferably, an epoxy resin B is added to the composition containing the chain-extended prepolymer. The epoxy resin B can in principle be the same as epoxy resin A if the latter is used for the preparation of the prepolymer; preferably, however, the epoxy resin B is different from the epoxy resin A, when used.

The epoxy resin B usually also contains at least one epoxy compound of the formula (III), which is normally contained as a byproduct in epoxy resins, as explained above. These epoxy compounds of formula (III) contained in epoxy resin B can react with the NCO end groups of the chain-extended prepolymer, so that the final composition contains epoxy group-terminated prepolymers. This reaction usually takes place even when the optional component d) was used to prepare the prepolymer, since in this case usually only a portion of the isocyanate groups of the chain-extended prepolymer formed was blocked by component d). When using component d) and epoxy resin B in the composition, therefore, epoxy group-terminated chain-extended prepolymers are usually formed in which the epoxy end groups are derived partly from component d) and partly from epoxy resin B or the epoxy compound of formula (III) contained therein.

The amount of chain-extended prepolymer added to epoxy resin B can vary. The higher the viscosity and the higher the NCO content of the prepolymer, the lower the amount to be added. Preferably, the composition contains about 15 to 25 wt.-% chain-extended prepolymer based on total weight of prepolymer and epoxy resin B.

The composition can also contain reactive diluents, which are described in more detail below. Reactive diluents usually also have free OH groups that can react with the prepolymer. Through the use of reactive diluents, e.g. Araldit®DY-C (cyclohexane dimethanol DGE) or Araldit®DY-T (trimethylol propane triglycidyl ether), the amount of prepolymer added, then based on the total weight of prepolymer, epoxy resin B and reactive diluents, can be increased.

The optionally and preferably used epoxy resin B as well as the optionally used epoxy resin A comprises or is preferably a reaction product of at least one epoxide such as epichlorohydrin and at least one diol, triol or higher-hydric polyol or a reaction product of an epoxy resin and at least one monophenol.

The epoxy resin B for the composition can be an epoxy resin or mixture of two or more epoxy resins. The epoxy resin can be a solid epoxy resin or preferably a liquid epoxy resin. The epoxy resin usually comprises, and preferably is a hydroxyl epoxy compound of formula (III), which can react with the prepolymer. The epoxy resin or liquid epoxy resin can be a commercially available epoxy resin product.

Examples of the epoxy resin B are in particular the diglycidyl ethers of formula (IV)

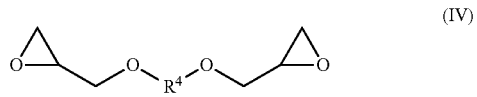

wherein $R^4$ represents a divalent aliphatic or mononuclear aromatic or dinuclear aromatic radical.

Diglycidyl ethers of formula (IV) include in particular
diglycidyl ethers of difunctional saturated or unsaturated, branched or unbranched, cyclic or open-chain $C_2$-$C_{30}$ alcohols such as ethylene glycol, butanediol, hexanediol, octanediol glycidyl ether, cyclohexane dimethanol diglycidyl ether, neopentyl glycol diglycidyl ether;

diglycidyl ethers of difunctional, low to high molecular weight polyether polyols such as, for example, polyethylene glycol diglycidyl ether, polypropylene glycol diglycidyl ether;

diglycidyl ethers of difunctional diphenols and optionally triphenols, wherein not only pure phenols are included but optionally also substituted phenols. The type of substitution can be very diverse. In particular, this includes substitution directly on the aromatic ring to which the phenolic OH group is attached. Moreover, the phenols are not only mononuclear aromatics but also polynuclear or fused aromatics or heteroaromatics having the phenolic OH group directly on the aromatic or heteroaromatic moiety. Suitable bisphenols and optionally triphenols are, for example, 1,4-dihydroxybenzene, 1,3-dihydroxybenzene, 1,2-dihydroxybenzene, 1,3-dihydroxytoluene, 3,05-dihydroxybenzoate, 2,2-bis-(4-hydroxyphenyl) propane (=bisphenol A), bis-(4-hydroxyphenyl) methane (=Bisphenol-F), bis-(4-hydroxyphenyl) sulfone (=bisphenol S), naphthoresorcinol, dihydroxynaphthalene, dihydroxyanthraquinone, dihydroxy-biphenyl, 3,3-bis-(p-hydroxyphenyl) phthalides, 5,5-bis-(4-hydroxyphenyl) hexahydro-4,7-methanoindane, phenolphthalein, fluorescein, 4,4'-[bis-(hydroxyphenyl)-1,3-phenylene-bis-(1-methylethylidene)] (=bisphenol M), 4,4'-[bis-(hydroxyphenyl)-1,4-phenylene-bis-(1-methylethylidene)] (=bisphenol P), 2,2'-diallyl bisphenol A, diphenols and dicresols, prepared by reaction of phenols or cresols with diisopropylidene benzene, phloroglucinol, gallic acid esters, phenol or cresol novolaks with OH functionality of 2.0 to 3.5, and all isomers of the aforementioned compounds.

Particularly preferred are epoxy resins based on diglycidyl ethers of bisphenol A (BADGE), bisphenol F or bisphenol A/F. These epoxy resins are widely available commercially. They can be obtained from the reaction of bisphenol A, bisphenol F or mixtures of bisphenol A and bisphenol F (also referred to as bisphenol A/F) with epichlorohydrin. Depending on the reaction conditions, low molecular weight or high molecular weight reaction products can be prepared.

Particularly preferably the epoxy resin B contains the β-hydroxy ether of formula (VI) as the epoxy compound of formula (III)

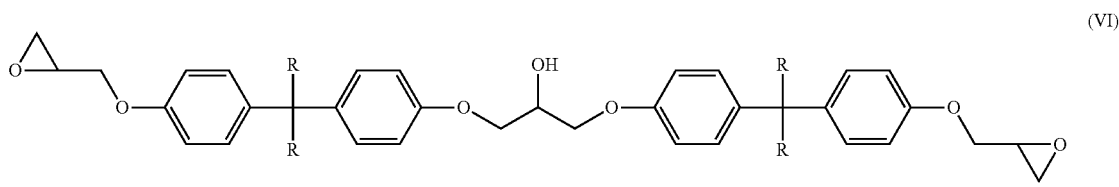

wherein R independently of one another is H or methyl, which is contained up to about 15% in commercially available liquid epoxy resins which are prepared from bisphenol A (R=$CH_3$) and epichlorohydrin, as well as the corresponding β-hydroxy ethers which are formed in the reaction of bisphenol-F (R=H) or the mixture of bisphenol A and bisphenol F with epichlorohydrin. In addition to the dimer of bisphenol A diglycidyl ether and the corresponding dimer with bisphenol F or mixtures of bisphenol A and bisphenol F according to formula (VI), also extended products of the BADGE bisphenol A addition or corresponding products with bisphenol F can be used which, for example, contain 3 or 4 bisphenol units. Such an extension is obtained in particular when a diglycidyl ether, in particular a diglycidyl ether of bisphenol A (BADGE) and bisphenol F, is reacted with a bisphenol at elevated temperature. It is advantageous to use such a bisphenol-extended diglycidyl ether with non-extended diglycidyl ether.

Accordingly, liquid epoxy resins of formula (A-I) and solid epoxy resins of formula (A-II) are particularly preferred.

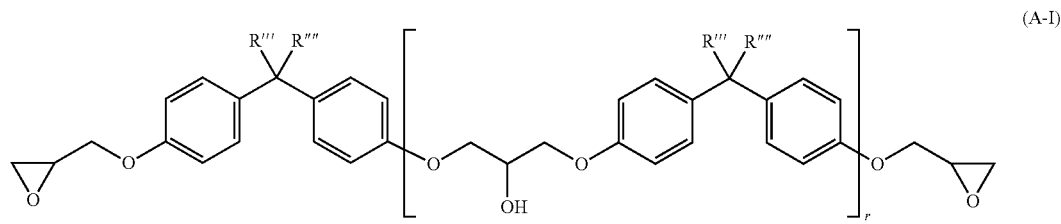

(A-I)

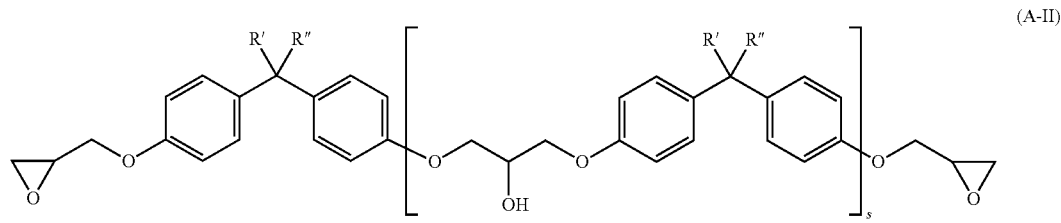

(A-II)

Here, the substituents R', R", R''' and R"" represent, independently of one another, either H or CH$_3$. Furthermore, the index r represents a value of 0.01 to 1, preferably 0.05 to 1. Preferably, r represents a value of less than 1, in particular less than 0.3 and preferably less than 0.2. The index s represents a value >1, in particular >1.5, in particular from 2 to 12. Compounds of formula (A-II) with an index s of between 1 and 1.5 are referred to by the skilled person as semisolid epoxy resins; however, here they are included as solid epoxy resins. The term "independently of one another" in the definition of groups and radicals in this document means in each case that several groups that are present but are designated identically in the formulas, in each case can have a different meaning.

Liquid epoxy resins of formula (A-I) are preferred. These are commercially available products, e.g., Araldite® GY 250, Araldite® PY 304, Araldite® GY 282 (Huntsman, or Hexion) or D.E.R® 331, DER® 330 or DER® 332 (Dow) or Epikote® 828 (Hexion).

In another embodiment, epoxy resins arising from the reaction of monophenols and epoxy resins, such as those, for example, obtained by reaction of p-methoxyphenol and D.E.R 332 can be used. Furthermore, various epoxides with a hydroxy ether group, prepared by the reaction of (poly) epoxides with a lesser quantity of monovalent nucleophiles such as carboxylic acids, phenols, thiols or sec-amines can be used. In a further embodiment, distillation residues which are obtained in the production of high-purity distilled epoxy resins can be used. Distillation residues such as Epilox® M850 contain significantly higher concentrations of hydroxyl-containing epoxy compounds than standard epoxy resins.

As needed and depending on the resulting viscosity, the composition may be diluted with other epoxy resins. Preferred for this purpose are diglycidyl ethers of bisphenol A, bisphenol F, and bisphenol A/F and epoxy group-bearing reactive diluents described below, in particular hexanediol diglycidyl ether, polypropylene glycol diglycidyl ether and trimethylol propane triglycidyl ether.

For a better understanding, schematic basic structures of the prepolymers prepared in the examples before and after the addition of epoxy resin B are shown below. As is known to the skilled person, these are complex reactions of starting compounds, which themselves are already mixtures, i.e., compounds of uniform molecular structure are not formed, but rather mixtures of compounds with varying degrees of conversion. In this sense, the structures below are to be understood only as schematic basic types.

Prepolymer of MDI and PolyTHF 2000, chain-extended with ethoxylated bisphenol A from Example 1:

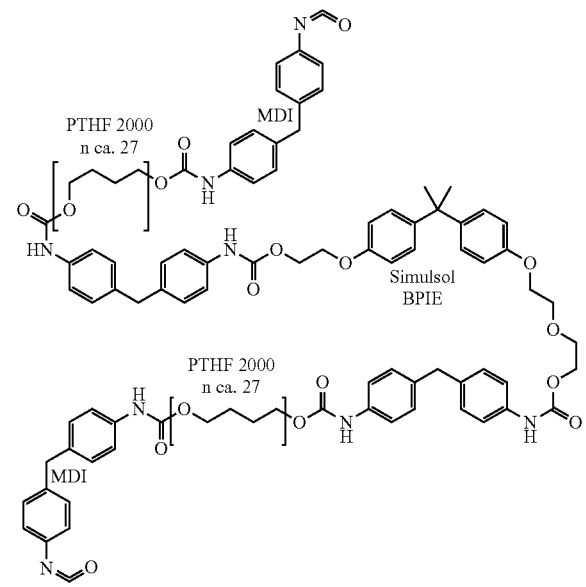

Prepolymer of MDI and PolyTHF 2000, chain-extended with ethoxylated bisphenol A and partial blocking with Erisys GE35H from Example 2:

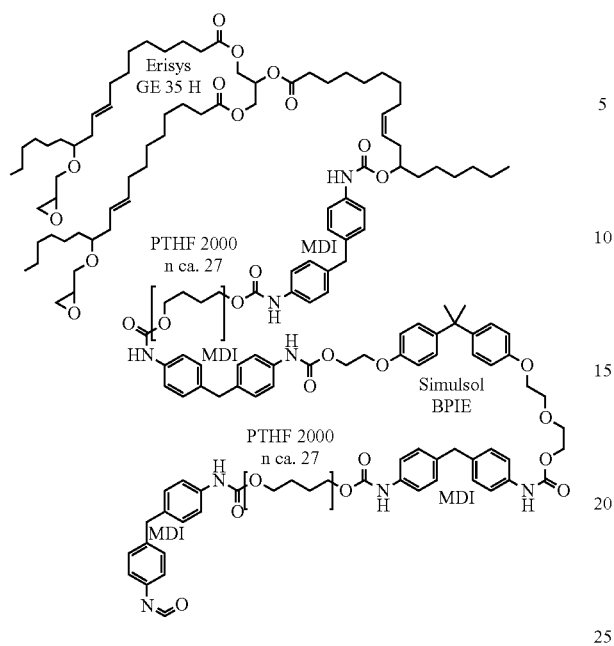
Prepolymer of Example 1 following reaction with epoxy resin B:
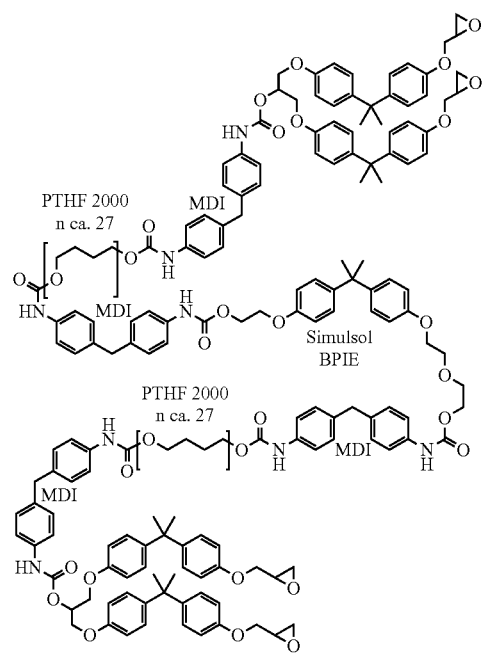
Prepolymer of Example 2 following reaction with epoxy resin B:
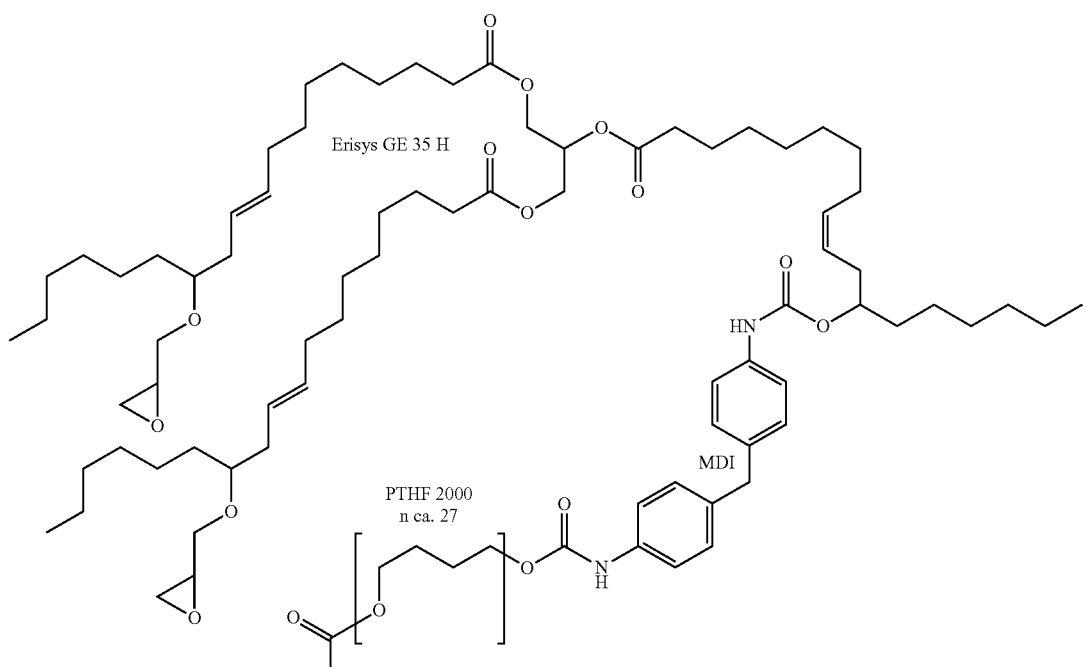

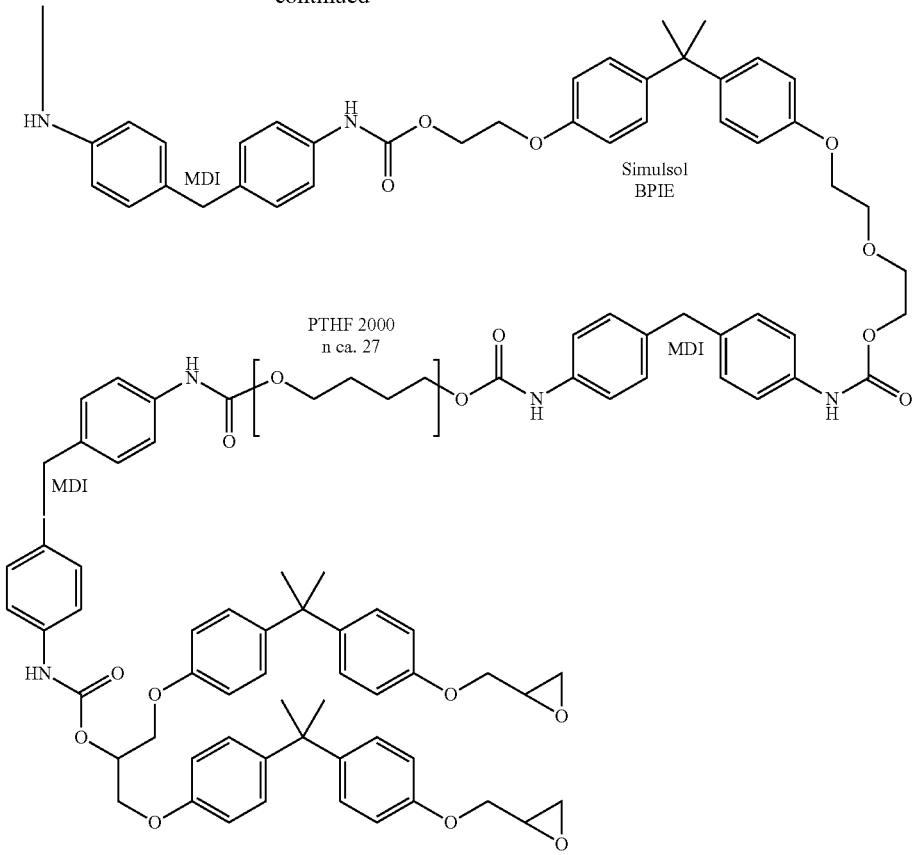

The composition according to the invention containing A) only the chain-extended prepolymer is suitable as a toughener. The addition of epoxy resin B results in a toughener-containing epoxy resin composition which can be used as the A component of a two-component epoxy resin composition, in particular a 2k epoxy resin adhesive. After adding suitable additives the composition can also be used as a one-component epoxy resin adhesive, but this is not preferred.

The A component is naturally used together with a B component, i.e., the curing component, of the 2k epoxy resin adhesive. E.g, polyamines, polymercaptans, polyamidoamines, amino-functional polyamine/polyepoxide adducts can be used as curing agents for epoxy resin compositions in the B component which are well-known to the skilled person as curing agents.

The composition may further contain other additives, such as those that are customary for the A component of a 2k epoxy resin adhesive. The composition may comprise, e.g., at least one additional optional impact strength modifier (SM). The additional impact strength modifiers (SM) may be solid or liquid.

Examples of additional impact strength modifiers (SM) are a liquid rubber (SM1), which is a carboxyl- or epoxy-terminated acrylonitrile/butadiene copolymer or a derivative thereof. Such liquid rubbers are commercially available, for example, under the names Hypro® (formerly Hycar®) CTBN and CTBNX and ETBN from Emerald Performance Materials LLC. Other optional impact strength modifiers (SM) are liquid polyacrylate rubbers (SM1), which are available as 20208-XPA from Rohm and Haas, for example.

In a further embodiment, the additional impact strength modifier (SM) may be a solid impact modifier which is an organic ion-exchanged layered mineral. The ion-exchanged layered mineral may be a cation-exchanged and/or anion-exchanged layered mineral. Preferred cation-exchanged layered minerals are known to the skilled person under the name Organoclay or Nanoclay and are commercially available, for example, under the group names Tixogel® or Nanofil® (Südchemie), Cloisite® (Southern Clay Products) or Nanomer® (Nanocor Inc.) or Garmite® (Rockwood). An example of an anion-exchanged layered mineral is a hydrotalcite, wherein at least part of the carbonate anions of the intermediate layers have been replaced by organic anions.

In a further embodiment, the additional impact strength modifier (SM) is a solid impact strength modifier which is a block copolymer (SM2). Examples are acrylate-styrene-acrylic acid (ASA) copolymers, which are available under the name GELOY® 1020 from GE Plastics, for example. Particularly preferred block copolymers (SM2) are block copolymers made of methyl methacrylate, styrene and butadiene. Such block copolymers are available, for example, as triblock copolymers under the group name SBM from Arkema.

In a further embodiment, the additional impact strength modifier (SM) is a core-shell polymer (SM3). Preferred core-shell polymers are so-called MBS polymers, which are commercially available under the trade name Clearstrength® from Arkema, Paraloid® from Dow (formerly Rohm and Haas) or F-351® from Zeon. Particularly preferred are core-shell polymer particles which are already present as dried polymer latex. Examples are GENIOP- ERL® M23A from Wacker with polysiloxane core and acrylate shell, radiation-crosslinked rubber particles of the NEP series, manufactured by Eliokem, or Nanoprene® from Lanxess or Paraloid® EXL from Dow. Other comparable examples of core-shell polymers are offered under the name Albidur® from Evonik Hanse GmbH, Germany. Also suitable are nanoscale silicates in an epoxy matrix, such as those offered under the trade name Nonopox from Evonik Hanse GmbH, Germany.

In another embodiment, the additional impact strength modifier (SM) is a reaction product (SM4) of a carboxylated solid nitrile rubber with excess epoxy resin.

The composition may comprise, of course, other components. These are in particular filler (F), reactive diluent (G), such as epoxy group-bearing reactive diluents, catalysts, stabilizers, in particular heat and/or light stabilizers, thixotropic agents, plasticizers, solvents, mineral or organic fillers, blowing agents, dyes and pigments, corrosion protection agents, surfactants, defoamers and adhesion promoters. As these additives, all known in the art can be used in the usual amounts.

The fillers (F) are, e.g., preferably mica, talc, kaolin, wollastonite, feldspar, syenite, chlorite, bentonite, montmorillonite, calcium carbonate (precipitated or ground), dolomite, quartz, silica (pyrogenic or precipitated), cristobalite, calcium oxide, aluminum hydroxide, magnesium oxide, hollow ceramic spheres, hollow glass spheres, hollow organic spheres, glass beads, colored pigments. Fillers (F) include both organic coated and uncoated forms that are commercially available and known to the skilled person.

Advantageously, the overall proportion of the total filler (F) is 3 to 50% by weight, preferably 5 to 35% by weight, in particular 5 to 25% by weight, based on the weight of the total composition (A component and B component).

The reactive diluents (G) are in particular:
glycidyl ethers of monofunctional saturated or unsaturated, branched or unbranched, cyclic or open-chain $C_4$-$C_{30}$ alcohols, in particular selected from the group consisting of butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether.

glycidyl ethers of difunctional saturated or unsaturated, branched or unbranched, cyclic or open-chain $C_2$-$C_{30}$ alcohols, in particular selected from the group consisting of ethylene glycol, butanediol, hexanediol, [or] octanediol glycidyl ethers, cyclohexane dimethanol diglycidyl ether and neopentyl glycol diglycidyl ether, glycidyl ethers of tri- or polyfunctional, saturated or unsaturated, branched or unbranched, cyclic or open-chain alcohols, such as epoxidized castor oil, epoxidized trimethylolpropane, epoxidized pentaerythritol or polyglycidyl ethers of aliphatic polyols such as sorbitol, glycerol or trimethylol propane.

glycidyl ethers of phenol and aniline compounds, in particular selected from the group consisting of phenyl glycidyl ether, cresyl glycidyl ether, p-tert-butyl-phenyl glycidyl ether, nonylphenol glycidyl ether, 3-n-pentadecenyl glycidyl ether (from cashew nut shell oil), N,N-diglycidyl aniline and triglycidyl of p-aminophenol.

epoxidized amines such as N,N-diglycidyl cyclohexylamine.

epoxidized mono- or dicarboxylic acids, in particular selected from the group consisting of glycidyl neodecanoate, glycidyl methacrylate, glycidyl benzoate, diglycidyl phthalate, tetra- and hexahydrophthalate and diglycidyl esters of dimeric fatty acids and diglycidyl esters of terephthalic acid and trimellitic acid.

epoxidized di- or trifunctional, low to high molecular weight polyether polyols, in particular polyethylene glycol diglycidyl ether or polypropylene glycol diglycidyl ether.

Particularly preferred are hexanediol diglycidyl ether, cresyl glycidyl ether, p-tert-butylphenyl glycidyl ether, polypropylene glycol diglycidyl ether and polyethylene glycol diglycidyl ether.

The composition is perfectly suitable as the A component of a 2k epoxy adhesive, and is preferably used for bonding on windmills, especially windmill rotor blades. In the case of 2k adhesives curing at room temperature can occur over the course of a few days up to 1 week, however, also an accelerated curing regimen such as, e.g., r.t. for 4 h followed by 30 min at 60° C. or 85° C. should be applicable. For the bonding of windmills, in particular windmill rotor blades, preferably curing occurs at a temperature of about 65° C. to 75° C.

Preferably, the composition according to the invention comprising epoxy resin B is prepared in a two-step process. For this purpose, first of all the components a), b) and c) and optionally d) are reacted in a reactor to obtain the chain-extended prepolymer. For the reaction, catalysts such as DBTL may be added. The reaction is preferably carried out at elevated temperature, e.g., above 45° C. In a second reactor a batch of resin comprising and preferably consisting of the epoxy resin B is vented and optionally dehydrated. The prepolymer, preferably still warm, is introduced to this batch and reacted. The reaction is also preferably carried out at elevated temperature, e.g., above 45° C.

Further additives that are typical for the A component of a 2k epoxy resin adhesive may be admixed with the composition prepared. Examples of such additives are listed above.

EXAMPLES

Below are a few examples that further illustrate the invention, but which shall in no way limit the scope of the invention. Unless otherwise indicated, all proportions and percentages are by weight.

Determination of the Isocyanate Content:

The isocyanate content in % by weight was determined by means of a back-titration with excess di-n-butylamine and 0.1 M hydrochloric acid. All measurements were made semi-manually on a Mettler-Toledo titrator model T70 with automatic potentiometric endpoint determination. For this purpose, 600-800 mg of the sample to be measured were dissolved with heating in a mixture of 10 ml of isopropanol and 40 ml of xylene, and then reacted with a solution of dibutylamine in xylene. Excess di-n-butylamine was titrated with 0.1 M hydrochloric acid and the isocyanate content was calculated therefrom.

TABLE 1

| Raw materials used | Description | Supplier |
| --- | --- | --- |
| PolyTHF ® 2000 | Polyol (difunctional polybutylene glycol with a molecular weight of 2000 g/mol) | BASF |
| Erysis ®GE 35 H | Castor oil glycidyl ether | CVC/Emerald Thermoset Specialities, Moorestown, NJ |

TABLE 1-continued

| Raw materials used | Description | Supplier |
| --- | --- | --- |
| Simulsol BPIE | Bisphenol A + 3 ethylene oxide | Sepic/Air Liquide |
| Desmodur 44MC | MDI | |
| Epikote ® 828LVEL | Standard bisphenol-A epoxy resin | Hexion |
| D.E.R. ® 331 | Standard bisphenol-A-epoxy resin | Dow |
| Dibutyl tin dilaurate (DBTL) | catalyst | Thorson |
| Epikote ®493 | Aniline DGE | Hexion |
| IPDA | Isophorone diamines | Degussa |
| Jeffamine RFD 270 | cycloaliphatic ether diamine | Huntsman |
| Tremin 939 Wollastonite | | HFP |
| Pyrogenic silica | | Wacker |

Example 1

A) Prepolymer 1

In a vacuum mixer, 200 g of PolyTHF 2000 and 40 g Simulsol BPIE were degassed and dehydrated under vacuum for 1 hour at 90° C. Then, the batch was cooled to 70° C. under vacuum. 85.6 g of liquefied MDI were added. The batch was reacted without catalyst for 1 hour at 70° C. It was then cooled to 60° C. Then, 0.1 g of DBTL was added. The reaction was continued under vacuum at 60° C. to a final NCO content of 3.2-3.4% (duration about 1 hour).

B) Epoxy Resin 1

In a vacuum mixer, 650 g of DER®331 (or alternatively Epikote® 828 LVEL) were degassed and dehydrated under vacuum for 1 hour at 90° C. The resin was cooled to 80° C. 194 g of prepolymer 1 prepared above were introduced into the degassed and dehydrated resin. Reaction of the batch was continued at 70° C. under vacuum to a final NCO content of <0.05% (about 3 hours). The resulting epoxy resin has a theoretical epoxy equivalent weight of 240 g/mol.

Example 2

A) Prepolymer 2

In a vacuum mixer, 160 g of PolyTHF 2000, 40 g of Erisys GE 35 H and 40 g of Simulsol BPIE were degassed and dehydrated under vacuum for 1 hour at 90° C. Then, the polyol was cooled to 70° C. under vacuum. 86.8 g of liquefied MDI were added. The batch was reacted without catalyst for 1 hour at 70° C. Then, the formulation was cooled to 60° C. Then, 0.1 g of DBTL were added. The reaction was continued under vacuum at 60° C. to a final NCO content of 3.1-3.3% (duration about 30 min).

B) Epoxy Resin 2

In a vacuum mixer, 668 g of DER®331 (or alternatively Epikote®828 LVEL) were degassed and dehydrated under vacuum for 1 hour at 90° C. The resin was cooled to 80° C. 157 g of prepolymer 2 prepared above were introduced into the degassed and dehydrated resin. Reaction of the batch was continued at 70° C. under vacuum to a final NCO content of <0.05% (about 3 hours). The resulting epoxy resin has a theoretical epoxy equivalent weight of 233 g/mol.

Examples 3 and 4

The epoxy resins 1 and 2 prepared above were used for formulating an A component 1 and 2, respectively, according to following Table 2, and evaluated in connection with a conventional curing agent according to Table 2 below. The A component according to the invention and the curing agent were mixed in a mixing device (Speedmixer®) in a weight ratio of 2:1 and then cured for 4 hours at 70° C. Then, the mechanical properties of the cured product were evaluated. Although the A components 1 and 2 according to the invention have a lower viscosity compared to typical commercial products (e.g., Kane Ace®MX 120), the mechanical properties are very good.

TABLE 2

| Component A | | |
| --- | --- | --- |
| Epoxy resin 1 [g] | 72 | |
| Epoxy resin 2 [g] | | 72 |
| Tremin 939 wollastonite [g] | 3.6 | 3.6 |
| Titanium dioxide (white pigment) [g] | 0.4 | 0.4 |
| Pyrogenic silica [g] | 4 | 4 |
| Epoxy - eq.-wt. [g/mol] | 267 | 259 |
| Component B | | |
| Epikote 493 [g] | 5.0 | 5.0 |
| IPDA [g] | 2.5 | 2.5 |
| Jeffamine RFD 270 [g] | 12.0 | 12.0 |
| Tremin 939 wollastonite [g] | 2 | 2 |
| Carbon black pigment [g] | 0.01 | 0.01 |
| Pyrogenic silica [g] | 2 | 2 |
| Amine eq.-wt., active H [g/mol] | 131 | 131 |
| Physical testing (after curing at 70° C., 4 h) | | |
| Tensile strength [MPa] | 47.9 | 43.0 |
| Elongation [%] | 3.3 | 2.5 |
| E module [0.5-1%] | 2187 | 2316 |
| Tensile shear strength [MPa]* | 22.0 | 14.9 |
| TG [° C.] | 83.9 | 91.8 |

*Specimen H30 + ZE, 1.5 mm, 0.3 mm adhesive layer

The invention claimed is:

1. A composition comprising a chain-extended prepolymer that is obtained by the reaction of a) at least one polymer of formula (I)

$$Y_1\!\!-\!\!\left[\!X_1H\right]_n \tag{I}$$

wherein $X_1$=O, S or NH; $Y_1$ represents an n-valent radical of a reactive polymer after removal of terminal amino, thiol or hydroxyl groups; and n=2, 3 or 4;

b) at least one polyisocyanate of the formula (II)

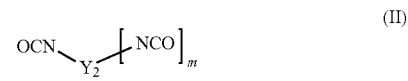

$$OCN\!\!-\!\!Y_2\!\!-\!\!\left[\!NCO\right]_m \tag{II}$$

wherein $Y_2$ represents a divalent radical of aliphatic, cycloaliphatic, aromatic or araliphatic diisocyanates after removal of the isocyanate groups, or a trivalent radical of trimers or biurets of aliphatic, cycloaliphatic, aromatic or araliphatic diisocyanates after removal of the isocyanate groups; and m=1 or 2; and c) at least one alkoxylated bisphenol as chain extender, wherein the at least one alkoxylated bisphenol has 3 to 15 mol of alkyleneoxy units per mol of bisphenol, and d) an epoxy compound containing a primary or secondary hydroxyl group of formula (III)

wherein $Y_3$ represents an aliphatic, cycloaliphatic, aromatic or araliphatic epoxy containing a primary or secondary hydroxyl group after removal of the epoxy groups and the primary or secondary hydroxyl group; and q=1, 2 or 3; or at least one epoxy resin A containing an epoxy compound of formula (III).

2. The composition according to claim 1, wherein the polymer of formula (I) is selected from polyether polyols, polybutadiene polyols, polyester polyols, polycarbonate polyols, NH-terminated polyethers and mixtures thereof.

3. The composition according to claim 1, wherein the polyisocyanate of formula (II) is selected from methylene diphenyl diisocyanate (MDI), hexamethylene diisocyanate (HDI), toluene diisocyanate (TDI), isophorone diisocyanate (IPDI), and mixtures thereof.

4. The composition according to claim 1, wherein the alkoxylated bisphenol is an alkoxylated, or an ethoxylated, bisphenol F, bisphenol E, bisphenol A, bisphenol AP, bisphenol B, bisphenol BP, bisphenol C, bisphenol FL, bisphenol G, bisphenol M, bisphenol P, bisphenol PH, bisphenol TMC or bisphenol Z.

5. The composition according to claim 1, wherein the components a), b), c) and d) are used in proportions such that the molar ratio of the isocyanate groups to the hydroxyl groups in these components is less than 1.

6. The composition according to claim 1, wherein the composition further comprises at least one epoxy resin B.

7. The composition according to claim 6, wherein the epoxy resin B comprises an epoxy compound of formula (III), which has reacted with the chain extended prepolymer.

8. The composition according to claim 6, wherein the epoxy resin A and/or the epoxy resin B is or comprises a reaction product of at least one epoxy and at least one diol, triol or higher hydric polyol, or a reaction product of an epoxy resin and at least one monophenol.

9. The composition according to claim 1, wherein the epoxy compound of formula (III) is selected from trimethylol propane diglycidyl ether, glycerol diglycidyl ether, butanediol diglycidyl ether and cyclohexanedimethanol diglycidyl ether, dimer of bisphenol A diglycidyl ether, dimer of bisphenol F diglycidyl ether, dimer of bisphenol A/F diglycidyl ether, or mixtures thereof.

10. The composition according to claim 1, wherein an epoxy resin A is used as the component d), which is a castor oil glycidyl ether containing a hydroxyl-containing epoxy compound of formula (III).

11. The composition according to claim 6, wherein the epoxy resin B is selected from a bisphenol A diglycidyl ether product, a bisphenol F diglycidyl ether product and a bisphenol A/F diglycidyl ether product.

12. The composition according to claim 11, wherein the epoxy resin comprises as hydroxy-epoxy compound of formula (III) a compound of formula (VI)

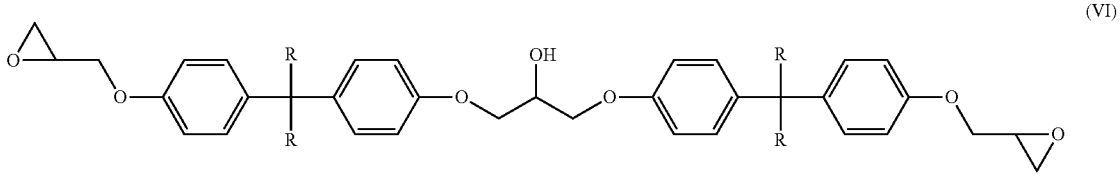

wherein R is independently of one another H or methyl.

13. The composition according to claim 1, further comprising a toughener.

14. A two-component epoxy resin adhesive, the two-component epoxy resin adhesive comprising the composition according to claim 1.

15. A process for preparing a composition according to claim 6 as an A component of a two-component epoxy resin adhesive, comprising A) the reaction of
  a) at least one polymer of formula (I)

wherein $X_1$=O,S or NH; $Y_1$ represents an n-valent radical of a reactive polymer after removal of terminal amino, thiol or hydroxyl groups; and n=2, 3 or 4;
  b) at least one polyisocyanate of the formula (II)

wherein $Y_2$ represents a divalent radical of aliphatic, cycloaliphatic, aromatic or araliphatic diisocyanates after removal of the isocyanate groups, or for a trivalent radical of trimers or biurets of aliphatic, cycloaliphatic, aromatic or araliphatic diisocyanates after removal of the isocyanate groups; and m=1 or 2; and
  c) at least one alkoxylated bisphenol as chain extender, wherein the at least one alkoxylated bisphenol has 3 to 15 mol of alkyleneoxy units per mol of bisphenol, and
  d) an epoxy compound containing a primary or secondary hydroxyl group of formula (III)

wherein $Y_3$ represents an aliphatic, cycloaliphatic, aromatic or araliphatic epoxy containing a primary or secondary hydroxyl group after removal of the epoxy groups and the primary or secondary hydroxyl group; and q =1, 2 or 3; or at least one epoxy resin A containing an epoxy compound of formula (III),
in a first reactor to produce a chain-extended prepolymer, and B) introducing the prepolymer produced in a vented and optionally dehydrated batch containing an epoxy resin B in a second reactor, and the reaction to yield the impact-resistant epoxy resin adhesive component.

16. The composition according to claim 1, wherein the components a), b), c) and d) are used in proportions such that the molar ratio of the isocyanate groups to the hydroxyl groups in these components is in a range of 0.75 to 0.9.

17. A two-component epoxy resin adhesive, the two-component epoxy resin adhesive comprising a toughener and the composition according to claim 1.

* * * * *